United States Patent [19]

Sutherland

[11] Patent Number: 4,663,970
[45] Date of Patent: May 12, 1987

[54] TAMPERPROOF WATER METER

[75] Inventor: Ray Sutherland, Hopwood, Pa.

[73] Assignee: Rockwell International Corporation, Pittsburgh, Pa.

[21] Appl. No.: 771,880

[22] Filed: Sep. 3, 1985

[51] Int. Cl.[4] ............................................. G01F 15/14
[52] U.S. Cl. ........................................ 73/273; 73/431
[58] Field of Search ................. 73/201, 253, 257, 273, 73/431; 116/212; 220/807

[56] References Cited

U.S. PATENT DOCUMENTS

| | | | |
|---|---|---|---|
| 3,308,664 | 3/1967 | Kullmann | 73/273 |
| 3,731,534 | 5/1973 | Painley et al. | 73/273 |
| 4,477,861 | 10/1984 | Byrd, Jr. et al. | 324/110 X |
| 4,485,672 | 12/1984 | Rosaen | 73/273 |

Primary Examiner—Herbert Goldstein

[57] ABSTRACT

A water meter is provided with a retaining ring which is mounted on the top wall of the main case and secured thereto by means of a connection requiring limited rotary motion for engagement. A bonnet within which the register housing is enclosed is mounted on the retaining ring by a similar rotary motion whereby removal of either the bonnet from the retaining ring or the retaining ring from the main case requires only limited rotary motion in the reverse direction. To prevent removal of the register by unauthorized individuals such reverse rotary motion is prevented by a locking pin which projects through the bonnet, the retaining ring and into a recess in the main case whereby relative rotary motion between the bonnet and the retaining ring and the retaining ring and the main case is prevented. Once in place the pin cannot be removed without visible deformation or destruction thereof.

4 Claims, 14 Drawing Figures

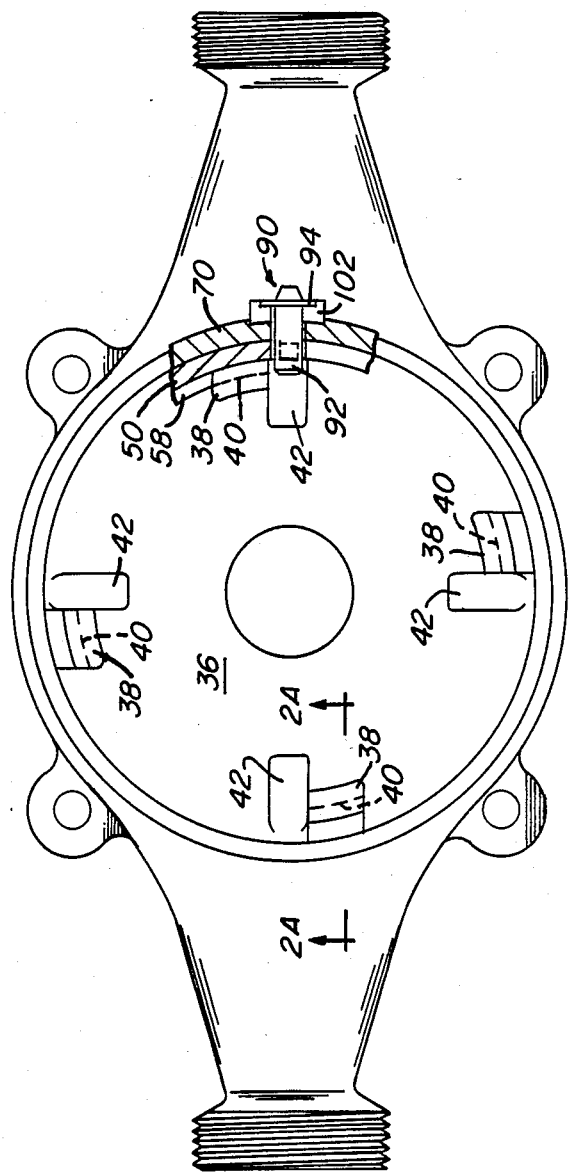
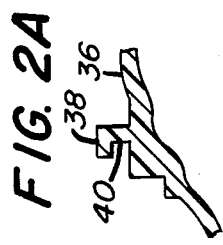

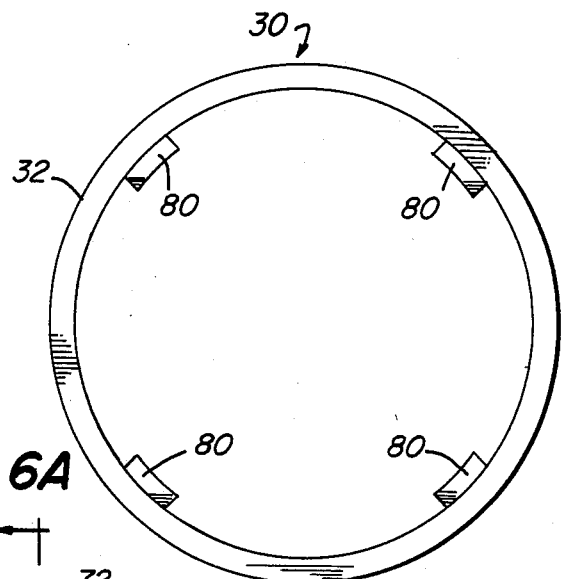
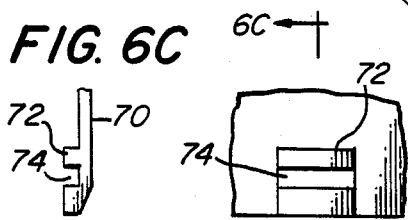
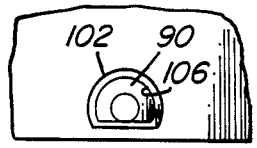
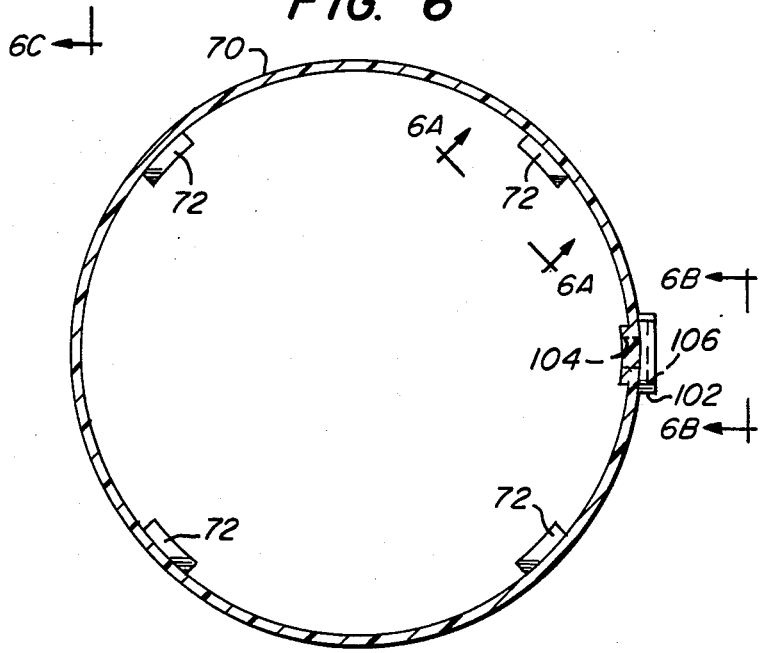

TAMPERPROOF WATER METER

FIELD OF THE INVENTION

The invention herein described relates to liquid meters and in particular to water meters in which the register may be readily replaced in the field by authorized individuals. Means is provided to prevent removal of the register by unauthorized individuals.

DESCRIPTION OF THE PRIOR ART

With the increase in the cost of water, gas and electricity in recent years the incentive for tampering with the utility meters to prevent the meters from registering the correct amount of utility usage has increased. Various arrangements have been resorted to in the past in attempts to frustrate such efforts to tamper with the registration on the meters. Typical examples of such attempts are shown in U.S. Pat. Nos. 3,355,945; 3,731,534 and 3,795,144.

U.S. Pat. No. 3,355,945 shows a molded plastic enclosure for completely enclosing the meter, the enclosure being sealed shut and being of a type to reveal by discoloration any attempt to obtain access to the meter. U.S. Pat. No. 3,731,534 shows a similar arrangement comprised of a housing within which a meter is enclosed, a special tamperproof arrangement being provided interlocking the body and housing top to permit limited rotation of the housing top to wipe the register viewing window which arrangement would require the breaking of a wire and seal to detach the housing top from the body. U.S. Pat. No. 3,795,144 shows a tamperproof plumbing arrangement for a water meter for preventing the reversing or bypassing of the flow through the meter.

Water meters of the type with which the instant invention is particularly concerned, are designed so that the register assembly may be quickly and easily removed and replaced in the field without disturbing or giving access to the flow measuring compartment or flow responsive element within the main case of the meter. The flow responsive element within the main case is drive coupled to the register through the wall of the main case by means of a magnetic coupling, the drive element of which is located within the main case and driven by the flow measuring element, the driven element of the magnetic coupling being located within the register housing and drive connected to the register mechanism within the housing. However, by making the register easily removable, means must be provided to prevent unauthorized removal of the register, otherwise the register could be removed by unauthorized individuals so as to prevent registration of the flow through the meter.

SUMMARY OF THE INVENTION

In order to provide easy removal of the register by authorized persons, Applicants have provided a retaining ring which is mounted on the top wall of the main case and secured thereto by means of a limited rotary motion within which the register housing is enclosed being mounted on the retaining ring by a similar rotary motion whereby removal of either the bonnet from the retaining ring or the retaining ring from the main case requires only limited rotary motion in the reverse direction. To prevent removal of the register by unauthorized individuals such reverse rotary motion is prevented by a locking pin which projects through the bonnet, the retaining ring and into a recess the main case whereby relative rotary motion between the bonnet and the retaining ring and the retaining ring and the main case is prevented. Once in place the pin cannot be removed without visible deformation or destruction thereof.

DESCRIPTION OF THE DRAWINGS

FIG. 2 is a plan view of the top of the main case of the meter of FIG. 1 with the register mechanism, the retaining ring and bonnet removed.

FIG. 2A is a cross sectioned view taken along the line 2A—2A of FIG. 2.

FIG. 5 is a view of the bottom of the housing enclosing the register mechanism.

FIG. 6 is a horizontal cross sectional view apart of only the bonnet shown in FIG. 6 which encloses the register taken along the lines 6—6 of FIG. 1.

FIG. 6A is a view of a portion of the bonnet wall taken along the lines of 6A—6A of FIG. 6.

FIG. 6B is a view of a portion of the exterior of the bonnet wall taken along the lines 6B—6B of FIG. 6.

FIG. 6C is a cross sectional view of the wall of the bonnet taken along the lines 6C—6C of FIG. 6A.

DESCRIPTION OF A PREFERRED EMBODIMENT

Figure 1:
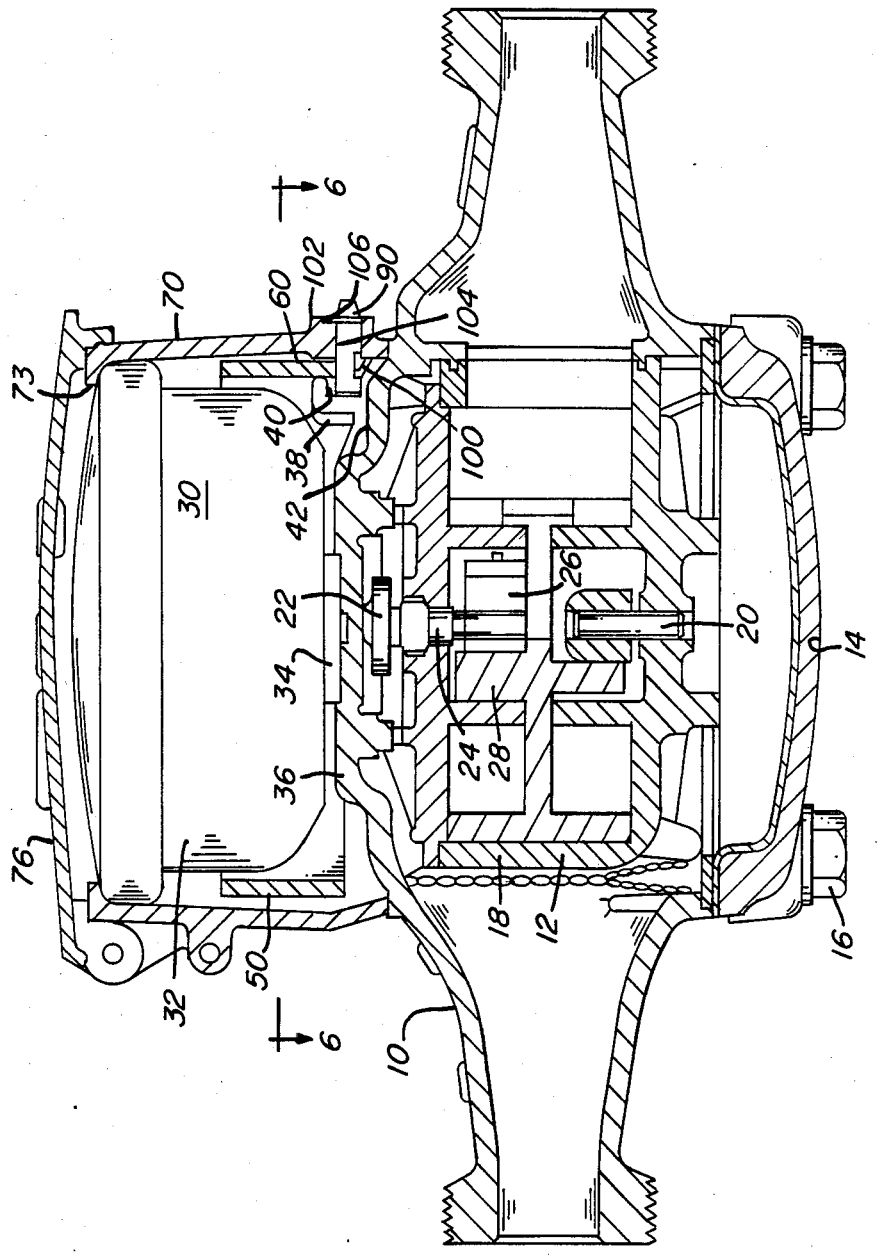
FIG. 1 is a cross section of an elevation view of a meter employing the instant invention.

Referring to the drawings, and in particular FIG. 1, a water meter is shown comprised of a main case 10 within which is received a measuring chamber 12 through an opening in the bottom wall of the main case which is closed by a cover 14 and bolts 16 projecting through the cover and threaded into the main case. Within the measuring chamber 12 is an oscillating piston 18 which oscillates about an axis defined by pin 20 and shaft 24 in response to the flow of fluid through the measuring chamber. A permanent magnet 22 is carried by shaft 24 which is journaled for rotation in the top wall of the measuring chamber. The opposite end of the shaft 24 carries a drive dog 26 which is engaged by a post 28 on the piston 18. Thus, as the piston 18 oscillates about the axis of shafts 20 and 24, it drives the dog 26 which, in turn, causes the permanent magnet 22 to rotate. The housing 32 of a register, identified generally the numeral 30, has a well portion 34 within which is located a second permanent magnet similar to an magnetically coupled to magnet 22. As the fluid flows through the meter and through the measuring chamber, the magnet 22 is caused to rotate, which because of the magnetic coupling through the top wall of main case 10 and wall portion 34 drives the magnet within the register housing 30 which in turn drives the register mechanism within the housing to provide an indication of the volumetric flow through the meter.

As best shown in FIGS. 2 and 2A, the top wall 36 of main case 10 has four equally spaced mounting cleats 38 integrally formed thereon, each of the cleats having an outwardly opening slot 40 milled therein.

Figure 3:
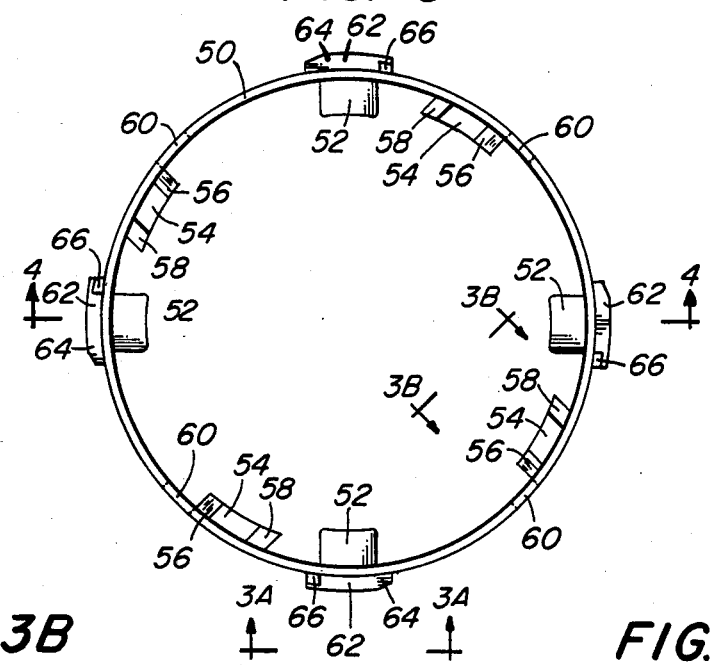
FIG. 3 is a top plan view of the retaining ring apart from the meter assembly.
Figure 3B:
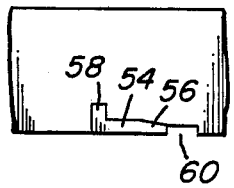
FIG. 3B is a view of a portion of the retaining ring taken along the lines 3B—3B of FIG. 3.
Figure 4:
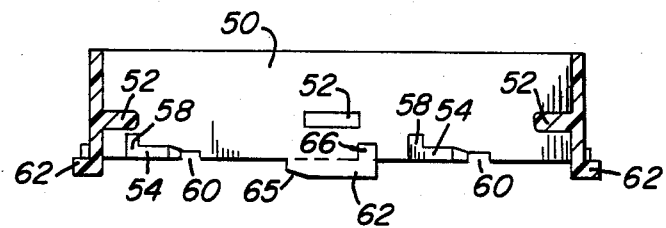
FIG. 4 is a cross sectional view of the retaining ring shown in FIG. 3 along the lines 4—4.

A retaining ring 50 is shown in top plan view in FIG. 3 independently of the meter assembly. The retainer ring may be of molded plastic such as glass filled acetal. Four equally spaced register support pads 52 project radially inwardly from the interior surface of the ring at a point approximately mid-way of its height as shown in FIG. 4. Also, four equally spaced interior locking tongues 54 project from the interior of the ring 50 and are angularly spaced from mounting pads 52. As best shown in FIG. 3B, locking tongues 54 have an inclined ramp 56 and a stop abutment 58. Openings 60 are formed n the ring 50 adjacent each of the tongues 54 at the end on which the ramp 56 is formed.

Figure 3A:
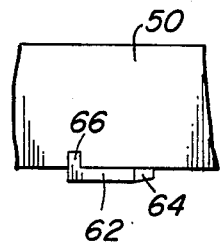
FIG. 3A is a view of a portion of the retaining ring taken along the lines 3A—3A of FIG. 3.

With reference to FIG. 3, four equally spaced exterior locking tongues 62 project from the exterior surface of the ring 50. As best shown in FIG. 3A, each locking tongue 62 is formed adjacent to the bottom of the ring 50 and has a ramp portion 64 and a stop abutment 66. As seen from FIG. 3, the exterior locking tongues 62 are radially aligned with mounting pads 52 and are angularly spaced from the interior locking tongues 54.

Referring to FIGS. 1 and 6, a register bonnet 70 of some suitable plastic material, such as Polycarbonate is mounted on the top wall 36 of the main case and encloses within it the retainer ring 50 and the register mechanism 30. Projecting radially inward from the interior surface of the bonnet 70 are four equally spaced bosses 72 (FIG. 6), each of which has a groove 74 (FIGS. 6A and 6C) formed in it for the reception of exterior locking tongues 62 on the retainer ring as will be more fully explained below. A cover 76 is hinged to the exterior of the bonnet 70 as shown in FIG. 1.

In assembly, the retaining ring 50 may be first mounted on the top wall 36 of the main case 10 by telescoping the lower part of the ring over the outer periphery of mounting cleats 38, with locking tongues 54 on the interior of the ring initially angularly displaced from mounting cleats 38. The ring is then rotated in a clockwise manner as viewed n FIG. 3 whereby locking tongues 54 are received into the grooves 40 in the mounting cleats 38. Ramps 56 on the locking lugs 54 facilitate reception of the tongues 54 into the grooves 40 and abutment stops 58 contact the side of the cleats 38 to establish the home position of the ring 50 with respect to the main case 10 and prevent any further clockwise (as viewed from the top of the ring) rotation of the ring with respect to the main case. The register 30 is then inserted within the ring 50 with mounting pads 52 which project radially inward from the ring 50 being received into four equally spaced recesses 80 formed in the bottom of register housing 32 (see FIG. 5). As best seen from FIG. 1, the bonnet 70 may then be telescoped over the ring 50 and the register 30 with an inwardly disposed rim 73 projecting inwardly from the top of the bonnet 70 in retaining contact with the top of the register 30 to clamp the register between rim 73 and the retaining ring when the bonnet 70 is secured in its place in the meter assembly. When the bonnet 70 is in position in surrounding relationship to the exterior of ring 50, the grooves 74 in bosses 72 (see FIGS. 6 and 6A) will be in annular alignment with exterior locking tongues 62 on ring 50 (see FIGS. 3, 3A and 4). The bonnet 70 may then be rotated in a clockwise direction as viewed from above to cause the exterior tongues 62 to be received into the grooves 74 until abutment stops 66 abut against the side of locking tongues 72 to prevent any further clockwise rotation of the bonnet 70 relative to the ring 50. The ramps 64 on exterior tongues 62 facilitate reception of the tongues 62 into the grooves 74. With the bonnet 70 secured to the ring 50 by tongues 62 on the exterior of the ring being received into grooves 74 on the interior of the bonnet, the register mechanism 30 is then effectively clamped between the annular flange 73 on the bonnet and the mounting pads 52 projecting from the interior of ring 50.

Figure 7A:
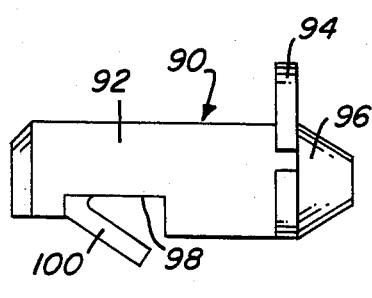
FIG. 7A is a side elevation view of the locking pin utilized in the instant invention.
Figure 7B:
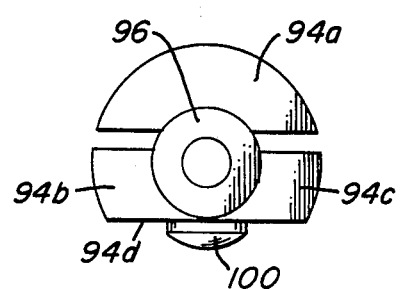
FIG. 7B is an end view of the locking pin shown in FIG. 7A.

In order to prevent unauthorized removal of the register from the main case 10, a locking pin 90 (FIG. 1) is inserted through an aperture 104 in the bonnet 70 and projects through recesses 60 in the locking ring 50 and into one of the recesses 42 formed n the top wall 36 of the main case (see FIGS. 1, 2, 7A and 7B). FIGS. 7A and 7B show the details of the locking pin 90 which is comprised of a shank portion 92, a segmented flange 94 and a conical head portion 96. A recess 98 is formed in the shank portion 92 near its free end and a resilient tab 100 projects beyond the outer surface of the shank portion 92. The entire pin 90 is preferably formed of some durable material such as polytetrafluroethelene. The flange 94 is comprised of three discrete segments 94a, 94b, 94c and has a flat surface 94d all as shown in FIG. 7B. The flat surface 94d is oriented to the same side of the shank 92 from which the tab 100 projects.

A boss 102 is formed in the outer surface of the bonnet 70 with an opening 104 extending through the wall of the bonnet and the boss (see FIGS. 1, 6 and 6B). A recess 106 is formed in boss 102 which has the same configuration as flange 94. Thus, pin 90 may be fully inserted through the opening 92 only in an orientation in which the tab 100 projects downwardly from the shank portion 92. In any one of four equally angularly spaced positions, the opening 104 through the bonnet will be aligned with openings 60 in the retaining ring 50 and recesses 42 in the top wall 36 of the main case. In each of these positions, the pin 90 may then be inserted with the flat portion 94d facing downwardly and the shank portion of the pin will extend through the opening 60 in the retainer ring and into the recess 42 in the main case. As the pin is inserted from the exterior of the bonnet, the tab 100 is deformed inwardly into the recess 98 in the shank of the pin until the tab 100 enters the opening 60 in the retainer ring at which point the tab 100 will spring back into its normal position where it will then abut against the interior surface of the bonnet 70 thus preventing removal from the exterior of the bonnet. Since the free end of the shank portion 92 of the pin also projects into recesses 42, any rotary movement of the assembly comprised of the bonnet 70, ring 50 and register 30 is prevented.

Since the flange 94 is fully received into recess 106 the wall of boss 102 prevents access to the edge of the flange thereby further reducing the opportunities for tampering with the pin for purposes of unauthorized removal. The conical portion 96 projects beyond the outer surface of the boss 102 so that it may be readily ascertainable visually whether or not the pin is still in place. The conical configuration of the portion 96 prevents the use of any tool to remove the pin by unauthorized individuals.

When authorized personnel wish to remove the subassembly comprised of the bonnet, retainer ring and the register, the pin may be driven through the opening 104 into the interior of subassembly by any suitable drive tool. This process, of course, results in the segments 94a, 94b, and 94c being broken away from the shank portion 92 of the pin. However, if such a procedure is resorted to by unauthorized individuals, the evidence of tampering would be clearly visible even if the broken pin were subsequently retrieved from the interior of the meter and reinserted into the aligned openings.

I claim:

1. A fluid meter comprised of a main case, first mounting means on said main case, a retainer ring on said main case having means cooperating with said first mounting means to secure said retainer ring on said main case upon rotation of said retainer ring relative to the main case, said retainer ring including an opening extending therethrough, second mounting means on said retainer ring, a meter bonnet circumscribing said retainer ring and having means cooperating with said second mounting means to secure said bonnet to said retainer ring upon rotation of said bonnet relative to said retainer ring, said bonnet including an opening extending therethrough which is aligned with the opening extending through said retaining ring when said means cooperating with said second mounting means is engaged therewith, a register mechanism clamped between a portion of said retainer ring and a portion of said bonnet, a locking pin projecting through aligned openings through said bonnet and said retainer ring and into engagement with said main case to prevent rotation of said retainer ring relative to said main case and rotation of said bonnet relative to said retainer ring, said pin having (a) segmented flange means adjacent the exterior of said bonnet which permits movement of said pin into the interior of said meter when said flange is broken by pushing inwardly against said pin, and (b) a radially projecting portion in engagement with an interior surface of said meter whereby removal of said pin toward the exterior of said meter is prevented when said pin in in said locking position.

2. The meter defined in claim 1 which said flange is comprised of frangible segments, which may be broken away from said pin when said pin is urged toward the interior of said meter.

3. The meter defined in claim 1 in which said flange is received in a recess on the exterior of said bonnet, the walls of said recess closely circumscribing the edge of said flange thereby preventing access to the edge of said flange.

4. The meter defined in claim 1 in which said flange is of assymmetrical configuration and is received in a recess in the exterior of said bonnet, the walls of said recess being of the same configuration as said flange and closely circumscribing the edge thereof whereby said flange may be received in said recess in only one position of orientation with respect to said recess.

* * * * *